United States Patent
Nagel et al.

(10) Patent No.: US 8,917,066 B2
(45) Date of Patent: Dec. 23, 2014

(54) METHOD AND APPARATUS OF SHUNT CONTROL FOR MULTIPLE POWER CONVERTERS ON A SHARED DC BUS

(75) Inventors: Gerry M. Nagel, Sussex, WI (US); Ryan J. Jwanouskos, White Bear Lake, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 128 days.

(21) Appl. No.: 13/569,251

(22) Filed: Aug. 8, 2012

(65) Prior Publication Data

US 2014/0042993 A1    Feb. 13, 2014

(51) Int. Cl.
  *G05F 1/613* (2006.01)
  *G05F 3/16* (2006.01)

(52) U.S. Cl.
  USPC ............................ 323/223; 323/220; 363/37

(58) Field of Classification Search
  CPC .................. H02M 5/44; H02M 3/155–3/158; G05F 1/46
  USPC ............ 323/223, 220; 363/34, 35, 37, 95, 97, 363/68; 318/33; 307/66
  See application file for complete search history.

(56) References Cited

U.S. PATENT DOCUMENTS

| | | | | |
|---|---|---|---|---|
| 4,985,819 A * | 1/1991 | Mori et al. | | 363/37 |
| 7,402,965 B2 * | 7/2008 | Oestreich et al. | | 361/33 |
| 2005/0219868 A1 * | 10/2005 | Inukai | | 363/20 |
| 2008/0031021 A1 * | 2/2008 | Ros et al. | | 363/46 |
| 2010/0078998 A1 * | 4/2010 | Wei et al. | | 307/31 |
| 2010/0080022 A1 * | 4/2010 | Schmidt | | 363/53 |
| 2011/0026280 A1 * | 2/2011 | Saruwatari et al. | | 363/37 |
| 2011/0267851 A1 * | 11/2011 | Nagel et al. | | 363/37 |
| 2013/0113283 A1 * | 5/2013 | Shiek | | 307/31 |
| 2013/0128633 A1 * | 5/2013 | Ichihara | | 363/37 |
| 2014/0136130 A1 * | 5/2014 | Nelson et al. | | 702/58 |

* cited by examiner

*Primary Examiner* — Timothy J Dole
*Assistant Examiner* — Shahzeb K Ahmad
(74) *Attorney, Agent, or Firm* — Boyle Fredickson, S.C.

(57) ABSTRACT

A system for managing shunt utilization among multiple power converters sharing a common DC bus is disclosed. Each power converter includes a shunt device, typically one or more power resistors, configured to dissipate power from the DC bus. The power converter is configured according to an initial set of configuration parameters to selectively connect the shunt device to the DC bus. Each power converter monitors the amount of power being dissipated from the DC bus via the shunt device connected to that power converter and determines a utilization rate for the shunt device. As the utilization rate increases, the configuration parameters are modified to less frequently connect the shunt device to the DC bus. As the utilization rate decreases, the configuration parameters are modified to more frequently connect the shunt device to the DC bus.

12 Claims, 7 Drawing Sheets

METHOD AND APPARATUS OF SHUNT CONTROL FOR MULTIPLE POWER CONVERTERS ON A SHARED DC BUS

BACKGROUND OF THE INVENTION

The subject matter disclosed herein relates generally to a system for dissipating regenerative energy in a power converter and, more specifically, to distributing dissipation of regenerative energy among multiple power converters sharing a common DC bus.

Adjustable speed motor drives (ASD) are used to control the speed of AC motors and are a common type of power converter to share a DC bus. AC motors use three-phase electrical power connected to the stator windings of a motor to run the motor. Each stator winding is connected to a different conductor from a three-phase power source, in which each conductor delivers a different phase of the electrical power to the motor. The three-phase power source may be a direct connection to line power, but more commonly, the motor is connected to the ASD. The ASD allows for speed control of the motor not available by connecting the motor directly to line power.

As is known in the art, there are many electrical topologies for ASDs used to convert the fixed voltage and frequency from the line input into a controlled voltage and frequency output for a three-phase motor. One common topology includes a rectifier section which converts the line power into a DC voltage used to charge a DC bus section of the ASD. An inverter section then controls a set of solid state switches, for example, via pulse width modulation (PWM), to convert the DC voltage from the DC bus into a variable voltage and frequency output to the motor. Controlling the variable voltage and frequency output to the motor controls the speed at which the motor rotates.

As the ASD controls the speed of the motor, there are periods of operation when the motor may enter a regenerative condition such as decelerating a high inertial load or maintaining a constant speed in the presence of an overhauling load (i.e., a load that would tend to accelerate the speed of the motor). Under a regenerative operating condition, the motor operates as a generator sending power back through the inverter section and onto the DC bus section of the ASD, causing the voltage level on the DC bus to rise. Unless this power is removed from the DC bus in some manner, the voltage continues to rise until it becomes too great, causing an over voltage fault and shutting down the ASD.

One way to avoid an over voltage fault is to provide the ASD with a conductive path connected to the DC bus on which to shunt the power generated by the motor. It is known to establish this alternate conductive path by selectively connecting an external resistor to the DC bus via an internal, solid-state switch such as a transistor. When the resistor is connected to the DC bus, current flows through the resistor and the power is dissipated from the resistor as heat. Control of the switch is performed as a function of the voltage level present on the DC bus.

In systems in which multiple ASDs are present, it is also known to electrically connect the DC bus of each ASD, which is also referred to as providing a common DC bus for multiple ASDs. With a common or shared DC bus, when a first ASD is operating in a regenerative mode, a second ASD may be operating in a motoring mode. The second drive uses a portion or all of the power regenerated from the first drive to operate the second drive. However, in a shared DC bus system, operating conditions still exist in which more energy is regenerated onto the DC bus than is consumed by the ASDs in the system. As an example, both ASDs may simultaneously operate in a regenerative mode. Thus, an alternate conductive path is still required.

However, sharing a DC bus among multiple ASDs each having a corresponding shunt resistor is not without its drawbacks. If a first ASD is configured to connect its respective shunt resistor at a lower voltage level than a second ASD, the first shunt resistor will be more heavily utilized to dissipate excess energy on the DC bus than the second shunt resistor. Further, shunt resistors are sized, in part, according to the power rating of the ASD to which they are connected. If the second ASD has a higher power rating than the first, the shunt resistor of the first ASD is subject to excessive loading and premature failure. Even if the first and second ASDs are configured to connect their respective shunt resistors at the same voltage level, measurement noise and bias will result in one of the two ASDs connecting its shunt resistor first, resulting in the same potential for excessive loading and/or premature failure of the shunt resistor.

BRIEF DESCRIPTION OF THE INVENTION

The subject matter disclosed herein describes a system for managing shunt utilization among multiple power converters sharing a common DC bus. Each power converter includes a shunt device, typically one or more power resistors, configured to dissipate power from the DC bus. The power converter is configured according to an initial set of configuration parameters to selectively connect the shunt device to the DC bus. Each power converter monitors the amount of power being dissipated from the DC bus via the shunt device connected to that power converter and determines a utilization rate for the shunt device. As the utilization rate increases, the configuration parameters are modified to less frequently connect the shunt device to the DC bus. As the utilization rate decreases, the configuration parameters are modified to more frequently connect the shunt device to the DC bus.

According to one embodiment of the invention, a method of controlling shunt utilization in a power converter sharing a DC bus with at least one other power converter, wherein the DC bus includes a first rail and a second rail, includes the steps of monitoring a magnitude of a voltage present on the DC bus, connecting a shunt device between the first rail and the second rail to discharge a desired amount of power when the magnitude of the voltage present on the DC bus exceeds a threshold, determining a utilization rate of the shunt device, and decreasing the desired amount of power discharged by the shunt device as the utilization rate increases.

According to another embodiment of the invention, a power converter for connection to a shared DC bus with variable shunt utilization includes a DC bus having a first rail, a second rail, and an output connection configured to connect the DC bus of the power converter to the shared DC bus. A pair of terminals is configured to connect to an external shunt device, and a switch is configured to selectively connect at least one of the terminals to one of the first or second rails of the DC bus. A sensor is configured to generate a signal corresponding to a magnitude of a voltage present on the DC bus. A non-transitory storage medium stores a program, and a processor is configured to read the program from the non-transitory storage medium. The processor is further configured to execute the series of instructions to read the signal corresponding to a magnitude of a voltage present on the DC bus, determine a utilization rate of the external shunt device, and control the switch as a function of the utilization rate and of the signal corresponding to a magnitude of a voltage present on the DC bus.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 1:
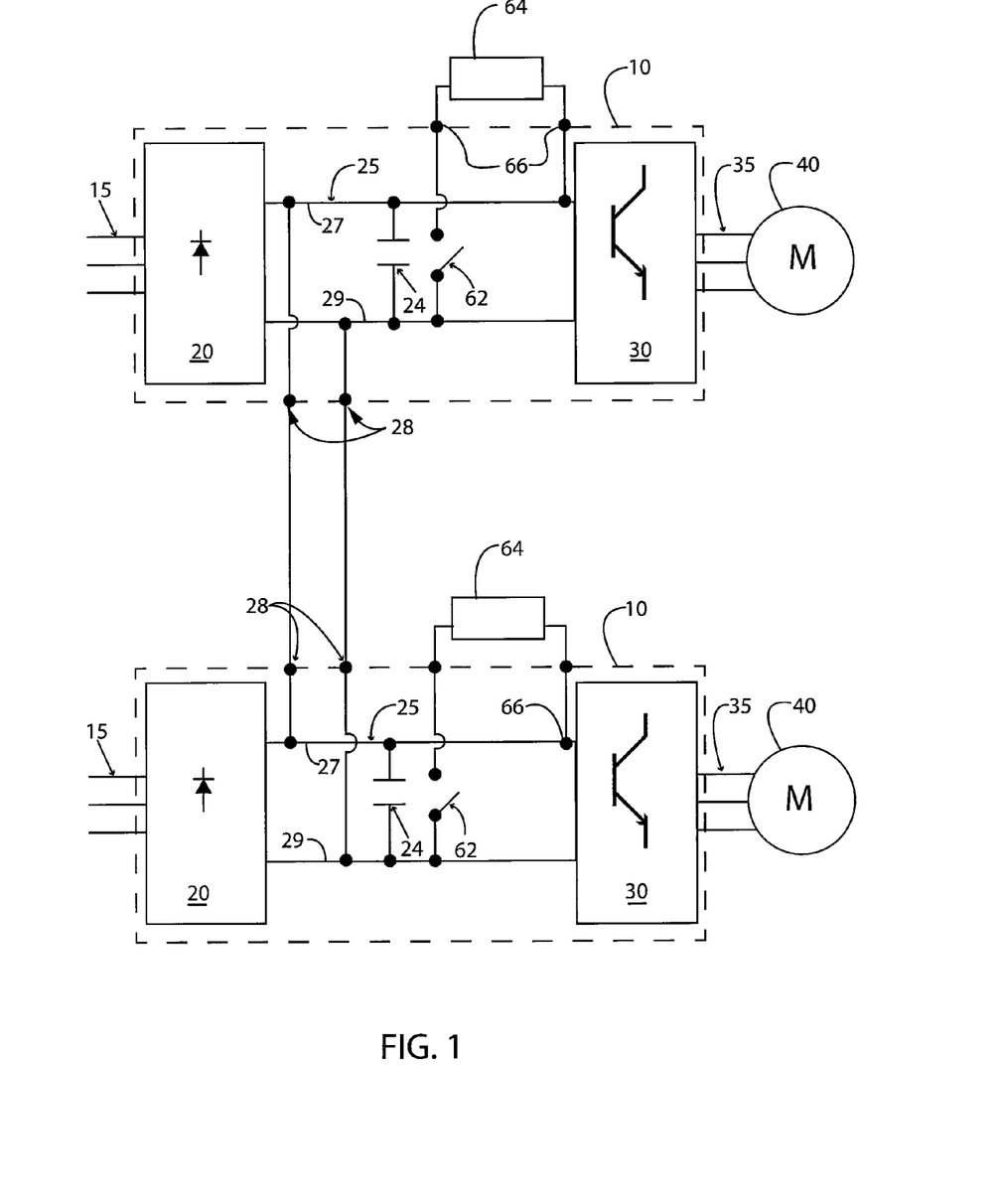
FIG. 1 is a schematic representation of a first and a second power converter according to one embodiment of the present invention.
Figure 2:
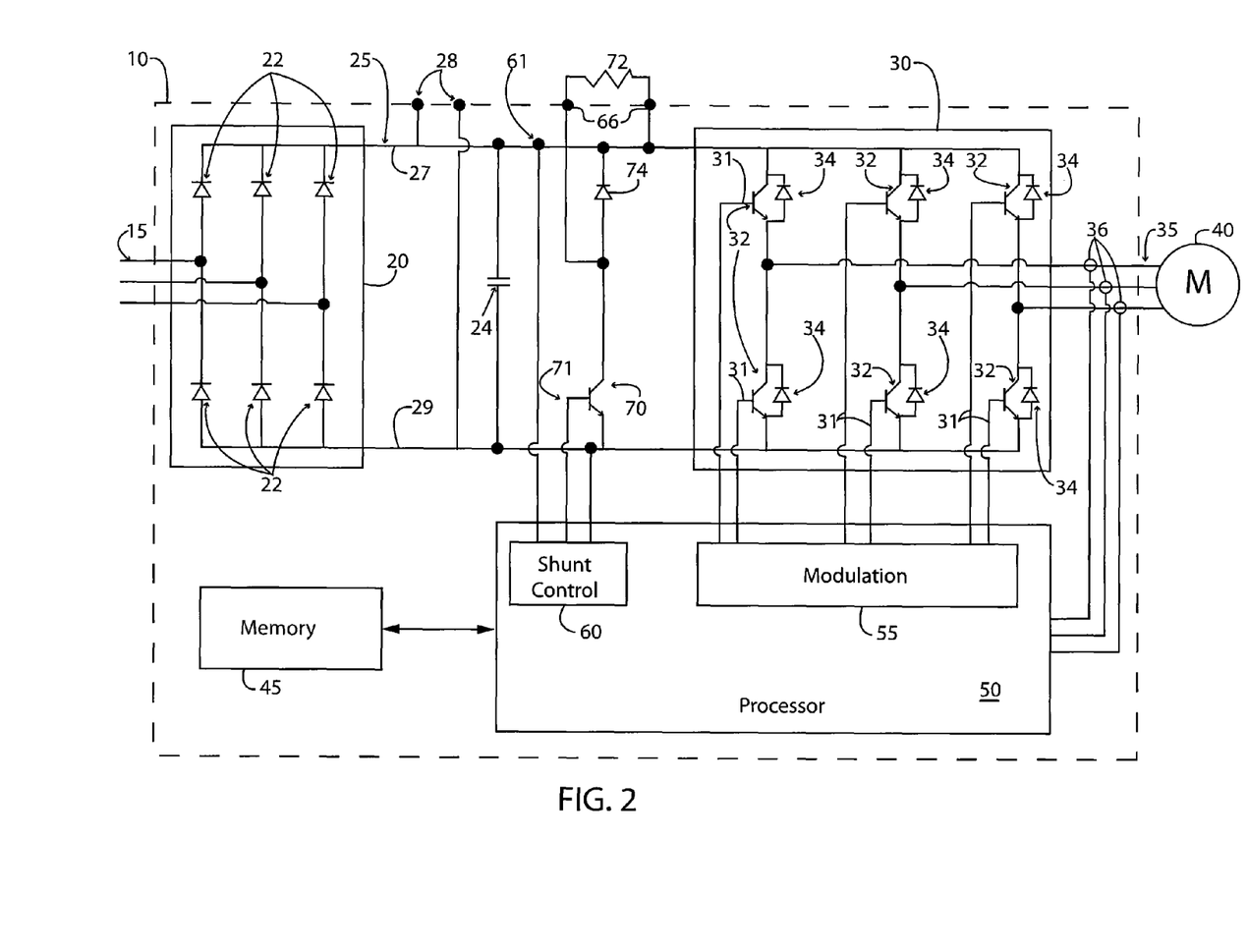
FIG. 2 is a schematic representation of one of the power converters of FIG. 1.

According to one embodiment of the invention, a first motor drive 10 and a second motor drive 10 are illustrated in FIG. 1, each motor drive 10 connected to a shared DC bus. Each of the first and second motor drives 10 have a common construction and will, therefore, be discussed in more detail with respect to one motor drive 10. Optionally, motor drives of varying construction may be connected at their respective DC buses. Each motor drive 10 is configured to receive a three-phase input power 15 at rectifier section 20. The rectifier section 20 may include any electronic device suitable for passive or active rectification as is understood in the art. Referring also to FIG. 2, the illustrated rectifier section 20 includes a set of diodes 22 forming a diode bridge that rectifies the three-phase input power 15 to a DC voltage on the DC bus 25. Optionally, the rectifier section 20 may include other solid state devices including, but not limited to, thyristors, silicon controlled rectifiers, or transistors to convert the input power 15 to a DC voltage for the DC bus 25.

The DC voltage potential is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the voltage potential between the negative and positive rails, 29 and 27, is generally equal to the magnitude of the peak of the AC input voltage. A first sensor 61 measures the voltage on the DC bus 25 and provides a signal corresponding to the measured voltage to a processor 50 on the motor drive 10.

The DC bus 25 is connected in series between the rectifier section 20 and the inverter section 30. The inverter section 30 consists of switching elements, such as transistors or thyristors as is known in the art. The illustrated inverter section 30 includes a transistor 32 and a flyback diode 34 connected in pairs between the positive rail 27 and each phase of the output voltage 35 as well as between the negative rail 29 and each phase of the output voltage 35. The inverter section 30 receives gating signals 31 from the processor 50 to control the transistors 32 and to convert the DC voltage from the DC bus 25 into a controlled three phase output voltage 35 to the motor 40.

One or more modules are used to control operation of the motor drive 10. Referring now to FIG. 2, the motor drive 10 includes a non-transitory storage device, or memory 45, configured to store data and a series of instructions executable by the processor 50. It is contemplated that the memory 45 may be a single device, multiple devices, or incorporated, for example, as a portion of another device such as an application specific integrated circuit (ASIC). The processor 50 is in communication with the memory 45 to read the instructions and data as required to control operation of the motor drive 10. According to one embodiment of the invention, the processor 50 receives a reference signal identifying desired operation of the motor 40 connected to the motor drive 10. The reference signal may be, for example, a speed reference or a torque reference. The program executes a control routine responsive to the reference signal and feedback signals from one or more sensors 36 providing voltage and/or current signals corresponding to one or more phases of the output 35 to the motor 40. The control routine generates a voltage reference signal which, in turn, is provided to a modulation routine 55. The modulation routine, such as pulse width modulation (PWM), generates gating signals 31 to control the transistors 32 responsive to the desired voltage reference signal.

Referring again to FIG. 1, the motor drives 10 are connected in a shared DC bus configuration. Each motor drive 10 includes terminals 28 connected to the positive rail 27 and the negative rail 29 of the DC bus 25. The terminals 28 of each motor drive 10 are electrically connected to establish the shared DC bus.

A shunt device 64 is connected to each motor drive 10 to dissipate excess power from the DC bus 25. Terminals 66 are configured to provide an electrical connection between the motor drive 10 and the shunt device 64. A switch 62 selectively connects either the negative rail 29 or the positive rail 27 to one of the terminals 66. The other of the negative rail 29 or the positive rail 27 is connected to the other terminal 66. Closing the switch 62 electrically connects the shunt device 64 across the DC bus 25 while opening the switch 62 disconnects the shunt device 64 from the DC bus 25. Referring also to FIG. 2, the switch 62 may be a transistor 70, for example, an insulated gate bipolar transistor (IGBT). The shunt device 64 may be a resistor 72 and, more specifically, a power resistor, configured to dissipate power across the resistor 72 as heat. A shunt control module 60 in the processor 50 receives the signal corresponding to the magnitude of the voltage present on the DC bus 25 and generates a control signal 71 for the switch 62.

In operation, the shunt control module 60 selectively connects the shunt device 64 to the DC bus 25 to reduce the amount of power present on the DC bus 25. When a motor drive 10 enters a regenerative operating condition, the voltage level on the DC bus 25 increases. If the voltage level increases too much, components of the motor drive 10 may be damaged. Consequently, the voltage level on the DC bus 25 must be kept below a certain maximum value, illustrated as the over voltage level, VDC_OV, 119 in FIG. 3 or the motor drive 10 will shut down to prevent the voltage level from increasing any further. According to one embodiment of the invention, the shunt control module 60 may use hysteretic control of the DC shunt device 64 to control the level of the DC voltage present on the DC bus 25. When the voltage level on the DC bus 25 reaches a first threshold, the shunt control module 60 generates the control signal 71 closing the switch 62 and connecting the shunt device 64 across the DC bus 25. As illustrated in FIG. 2, the shunt device 64 is a resistor 72 and, as is known in the art, the power dissipated in the resistor 72 is equal to the square of the current conducted through the resistor 72 times the resistance value. As the power is dissipated from the DC bus 25, the voltage level on the DC bus 25 decreases. When the voltage level on the DC bus 25 drops below a second threshold, the shunt control module 60 generates the control signal 71 opening the switch 62 and disconnecting the shunt device 64 from across the DC bus 25. Optionally, the first and second thresholds may be the same value; however, to prevent rapid transitions between a connected and disconnected state, the first and second thresholds are offset from each other defining a hysteretic control of the DC shunt device 64.

Figure 3:
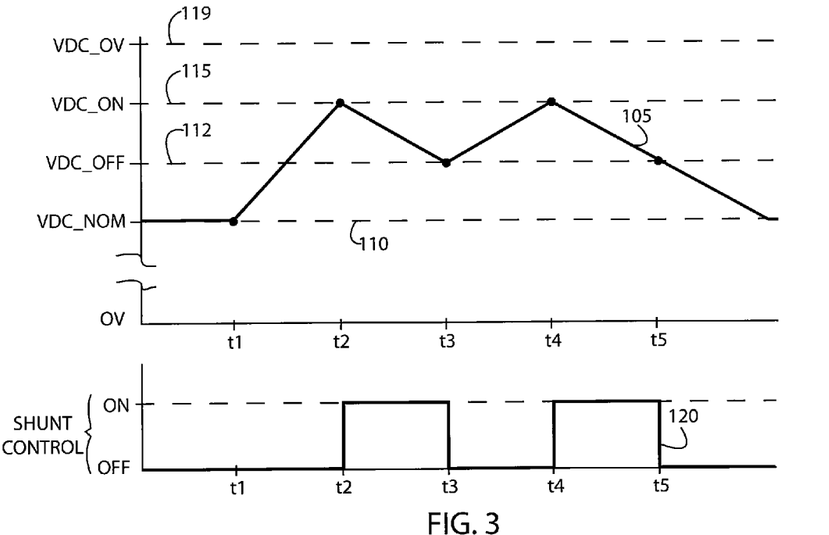
FIG. 3 is a graphical representation of shunt operation according to one embodiment of the present invention.

Referring next to FIG. 3, exemplary operation of the shunt control module 60 is illustrated. The level of voltage on the DC bus 105 is illustrated for one exemplary regenerative operation. The level of voltage on the DC bus 105 is normally held at a nominal DC voltage level 110, VDC_NOM, which may be a function of the peak value voltage of the AC input power 15 resulting from rectifying the voltage. For example, a 230 VAC input results in a nominal DC voltage level 110 of 325 VDC and a 460 VAC input results in a nominal DC voltage level 110 650 V DC voltage. Optionally, an active rectifier may boost the nominal DC voltage level 110 by a desired offset value of 5-10%. At time $t_1$, the motor drive 10 enters regenerative operation and the voltage level 105 on the DC bus 25 begins to rise. At time $t_2$, the voltage level 105 reaches the turn on threshold 115, VDC_ON and the shunt control signal 120 turns on. The shunt control signal 120 may be used to directly control shunt switch 62 or, as discussed in more detail below, may be used as an enable signal used in cooperation with a shunt switch signal 130. Having connected the shunt device 64 across the DC bus 25, the voltage level 105 begins to drop. At time $t_3$, the voltage level 105 reaches the turn off threshold 112, VDC_OFF and the shunt control signal 120 turns off. However, because the motor drive 10 is still in regenerative operation, the voltage level 105 begins to rise again. At time $t_4$, the voltage level 105 again reaches the turn on threshold 115, VDC_ON and the shunt control signal 120 turns on. This cycle repeats until the motor drive exits regenerative operation (e.g., between times $t_4$ and $t_5$). At time t5, the voltage level 105 again reaches the turn off threshold 112, VDC_OFF and the shunt control signal 120 turns off. Because the motor drive 10 is no longer in regenerative operation, the voltage level 105 returns to the nominal DC voltage level 110.

Figure 4:
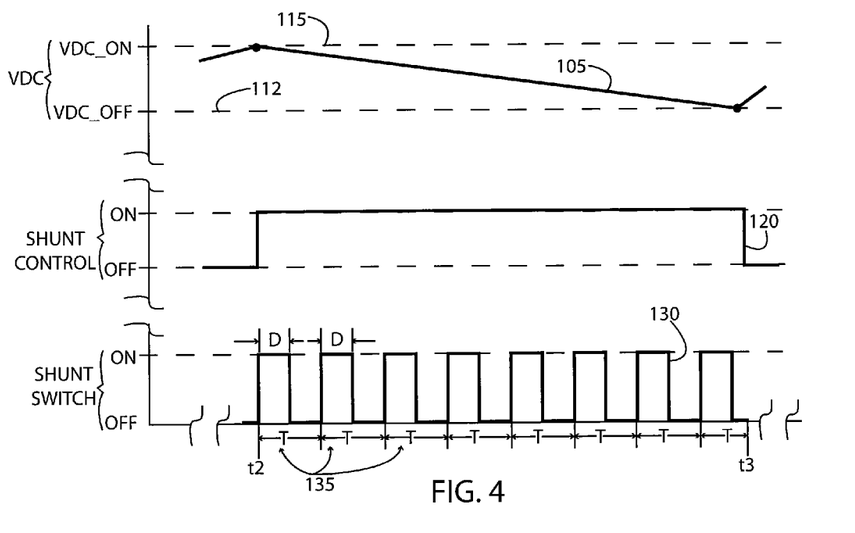
FIG. 4 is a graphical representation of modulation of the shunt device according to one embodiment of the present invention.

A portion of the cycle of exemplary operation discussed with respect to FIG. 3, is illustrated in more detail in FIG. 4. According to the embodiment illustrated in FIG. 4, the shunt control module 60 utilizes the shunt control signal 120 as an enable signal and generates a periodic shunt switch signal 130, which selectively enables/disables the shunt switch 62. As shown, the shunt control module 60 is configured to connect the shunt device 64 in a modulated manner. The shunt control module 60 generates a pulsed shunt switch signal 130 at a repeated interval having a period, T, and a duty cycle, D. When both the shunt control signal 120 and the switch signal 130 are on, the shunt switch 62 is closed, connecting the shunt device 64 across the DC bus 25. If either signal, 120 or 130, is off, the shunt switch 62 is opened. Thus, during the period between $t_2$ and $t_3$ shown in FIG. 3, the shunt device 64 is repeatedly connected to and disconnected from the DC bus 25. The modulation occurs, for example, at 500 Hz, resulting in a 2 msec period, T. The shunt control module 60 may also vary the duty cycle, for example, as a function of the level of DC voltage 105 present on the DC bus 25 to discharge more power across the shunt device 64 as the level of DC voltage 105 continues to increase.

Although each motor drive 10 is connected to a corresponding shunt device 64, connecting the motor drives 10 with a shared DC bus 25 presents additional challenges in regulating the voltage level 105 on the DC bus 25. According to the embodiment illustrated in FIG. 1, each of the motor drives 10 is connected only at the respective DC bus terminals 28. No additional communication is provided between the motor drives 10. Although illustrated as identical motor drives 10, each motor drive 10 may have different power ratings, different switching frequencies, or different shunt regulation methods. In addition, even identical motor drives 10 include variations in measurements of the voltage level 105 on the DC bus 25 due to component manufacturing tolerances that may manifest in varying offsets in sensors or noise susceptibility. Thus, even if motor drives 10 are configured to turn on and off their respective shunt devices 64 at the same threshold values 112, 115, one of the motor drives 10 will command the shunt device 64 to connect prior to the other, resulting in a higher utilization rate for that drive 10. In addition, if the motor drives 10 have different power ratings, the potential exists that the motor drive 10 with a lower power rating will connect its shunt device 64 first, resulting in the lower rating drive dissipating at least a portion of the illustrated energy supplied to the DC bus 25 from the motor drive 10 with a higher power rating.

Figure 9:
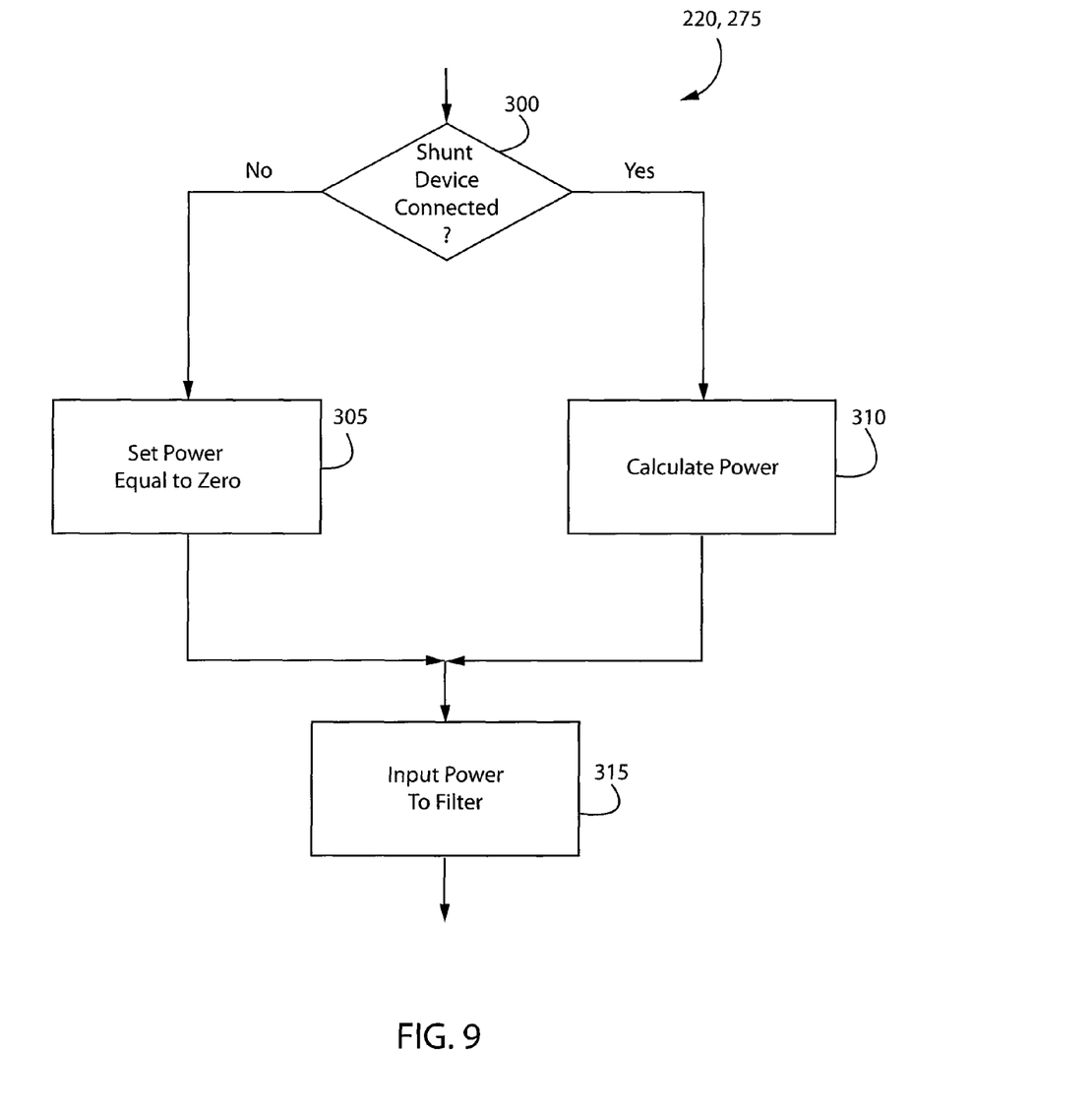
FIG. 9 is a flowchart illustrating determination of the utilization rate of a shunt device according to one embodiment of the present invention.

To overcome the above-described challenges, each shunt control module 60 maintains a utilization rate for the shunt device 64 connected to the respective motor drive 10. Referring next to FIG. 9, the utilization rate is determined as a function of the power dissipated by the shunt device 64. If the shunt device 64 is a power resistor 72 and a hysteretic control is utilized, the shunt control module 60 attempts to return the voltage level 105 on the DC bus 25 back to the shut off level 112 by dissipating power from the DC bus 25 in the power resistor 72. To determine the utilization rate, the processor 50 first checks whether the shunt device 64 is connected across the DC bus 25, as shown at step 300. If the shunt device 64 is not connected, the power is set to zero, as shown at step 305. However, if the shunt device 64 is connected to the DC bus 25, the processor 50 determines the amount of power dissipated in the shunt device 64, as shown in step 310. For the power resistor 72 illustrated, the amount of power dissipated may be determined according to Equation 1.

$$P = \frac{V_{DCBus}^2}{R} \tag{1}$$

where:
$V_{DC\ Bus}$ is the measured voltage level on the DC bus
R is the resistance value of the shunt resistor
The amount of power calculated in Eq. 1 is converted to a normalized value by dividing it by the rated amount of power the shunt device 64 may dissipate. At step 315, the power dissipated by the shunt device 64 is provided as an input to a filter, such as a digital low-pass filter. Because the power was normalized, the input and consequently the output of the filter will typically be in a range of 0.0-1.0 where 0.0 indicates no power dissipated and 1.0 indicates rated power dissipated by the shunt device 64. The output of the filter is provided to the shunt control module 60 as the utilization rate of the shunt device 64. The shunt control module 60 regulates the amount of power dissipated by the shunt device 64 to the DC bus 25 as a function of the utilization rate.

Figure 7:
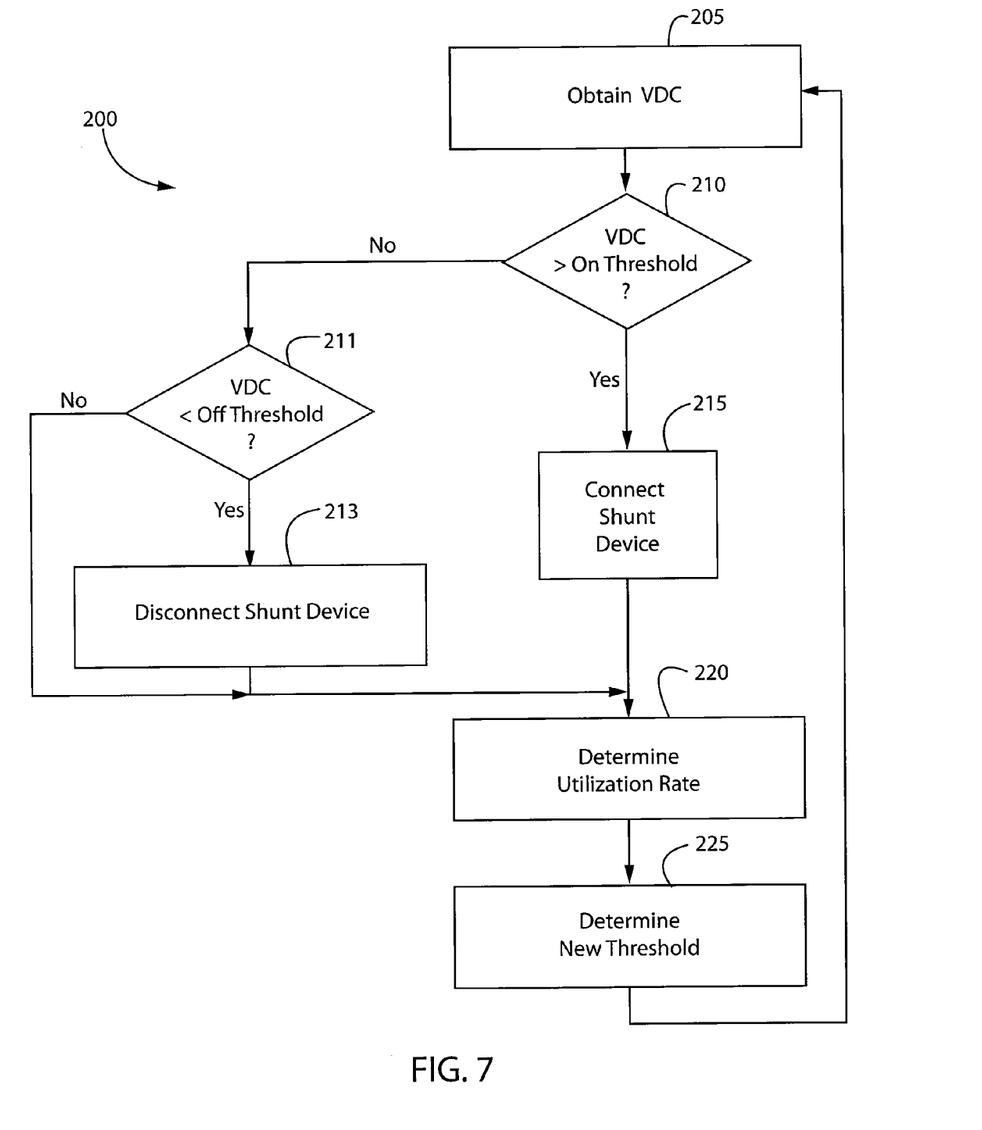
FIG. 7 is a flowchart illustrating variation of the voltage thresholds of the shunt device according to one embodiment of the present invention.

According to one embodiment of the invention, the shunt control module 60 may vary the on and off thresholds, 115 and 112, respectively, at which the shunt control signal 120 is turned on and off to vary the power dissipated by the shunt device 64. Referring to FIG. 7, a flowchart 200 illustrates the steps executed by the processor 50 to vary the voltage thresholds 115, 112 at which the shunt device 64 turns on and off, respectively. At step 205, the processor 50 obtains the voltage level 105 present on the DC bus 25. The voltage level 105 is compared against the initial value of the turn on threshold 115 at step 210. If the voltage level 105 is greater than the turn on threshold 115, the shunt device 64 is connected as shown in step 215. If the voltage level 105 is less than the turn on threshold 115, the voltage level 105 is then compared against the initial value of the turn off threshold 112 at step 211. If the voltage level 105 is less than the turn off threshold 112, the shunt device 64 is disconnected as shown in step 213. If, however, the voltage level 105 is less than the turn on threshold 115 but greater than the turn off threshold 112, than the shunt device 64 remains in its current state. At step 220, the utilization rate of the shunt device 64 is determined as discussed above with respect to FIG. 9. In step 225, the turn on and turn off voltage thresholds 115, 112 are adjusted as a function of the utilization rate. As the utilization rate increases, at least one of the turn on and turn off voltage thresholds 115, 112 are increased such that the shunt device 64 is used less frequently. As the utilization rate decreases, the turn on and turn off voltage thresholds 115, 112 are decreased such that the shunt device 64 is used more frequently. According to one embodiment of the invention, a look up table is stored in memory 45 that defines new threshold values corresponding to varying utilization rates. Optionally, the threshold values may be varied, for example, as a linear function of the utilization rate.

Figure 5:
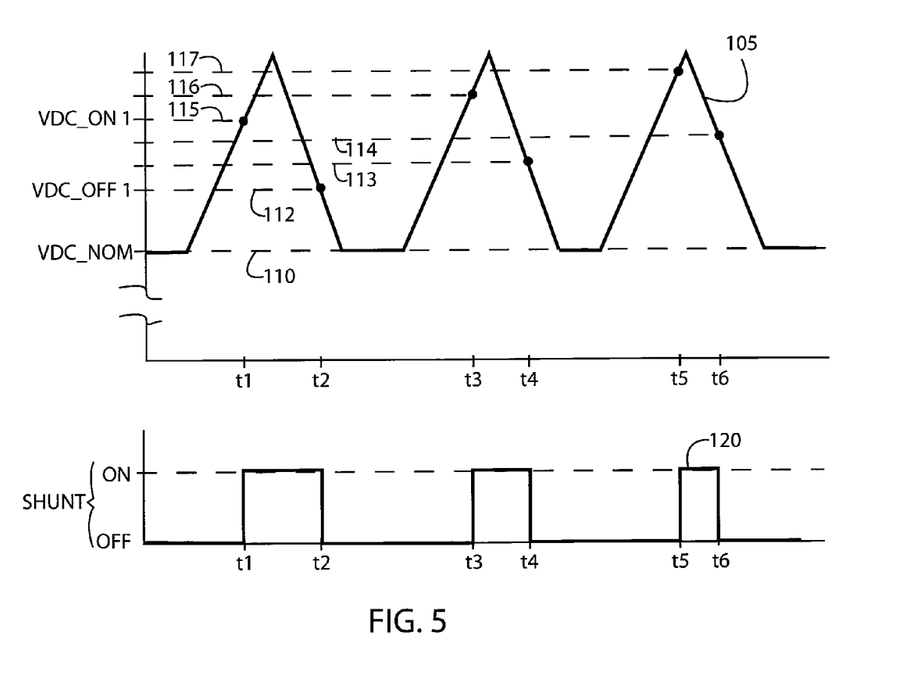
FIG. 5 is a graphical representation of varying the voltage thresholds of the shunt device according to one embodiment of the present invention.

Referring also to FIG. 5, exemplary operation of the shunt control module 60 during three consecutive regenerative operations, during which the voltage thresholds 112, 115 are varied, is illustrated. According to the illustrated operation, the voltage level 105 on the DC bus 25 rises from the nominal level 110 to a peak value and then returns to the nominal level 110 over three consecutive regenerative operations. During the initial regenerative operation, the shunt control signal 120 turns on when the voltage level 105 reaches the initial turn on threshold 115 at $t_1$ and remains on until the voltage level 105 drops below the initial turn off threshold 112 at $t_2$. After a short duration at the nominal DC voltage level 110, the voltage level 105 on the DC bus 25 again begins to rise. During operation, the shunt control module 60 monitors utilization of the shunt device 64. As a result, the value of the thresholds are increased from the initial turn on threshold 115 to a second turn on threshold 116 and from the initial turn off threshold 112 to a second turn off threshold 113. During the second regenerative operation, the shunt control signal 120 turns on when the voltage level 105 reaches the second turn on threshold 116 at $t_3$ and remains on until the voltage level 105 drops below the second turn off threshold 113 at $t_4$. After a short duration at the nominal DC voltage level 110, the voltage level 105 on the DC bus 25 again begins to rise. Again, the shunt control module 60 monitors utilization of the shunt device 64. As a result, the value of the thresholds are increased from the second turn on threshold 116 to a third turn on threshold 117 and from the second turn off threshold 113 to a third turn off threshold 114. During the third regenerative operation, the shunt control signal 120 turns on when the voltage level 105 reaches the third turn on threshold 117 at $t_5$ and remains on until the voltage level 105 drops below the third turn off threshold 114 at $t_6$. As a result of the increasing threshold values, the shunt control signal 120 is turned on for a shorter duration during each subsequent regenerative operation. If the voltage level 105 on the DC bus 25 remains at the nominal value 110, or at least below the present values thresholds, for an extended duration, the shunt control module 60 will lower the threshold values until they return to the initial values. If the input power 115 to the motor drive 10 is 460 VAC, the initial turn on threshold 115 may be selected, for example, at 775 VDC and the initial turn off threshold 112 may be selected, for example, at 765 VDC. This provides a 10V hysteresis band to prevent toggling of the shunt control signal 120 at the turn on value. The voltage thresholds may be increased, for example, up to 30 VDC above the initial values, providing a range of 775-805 VDC for the turn on threshold and 765-795 VDC for the turn off threshold.

When multiple motor drives 10 are connected to a common DC bus, variation of the voltage thresholds 115, 112 prevents the shunt device 64 of a single motor drive 10 from becoming overloaded if that motor drive 10 would otherwise be the first to connect its shunt device 64 to the DC bus 25. If one motor drive 10 is continually connecting its corresponding shunt device 64 to the DC bus 25, its voltage thresholds will increase such that a second motor drive 10 will begin to connect its corresponding shunt device 64 to the DC bus 25 before the first motor drive 10. Further, as the second motor drive 10 is now the first to connect its shunt device 64 to the DC bus 25, its voltage thresholds begin to increase while the voltage thresholds on the first motor drive 10 begin to decrease. Consequently, each of the motor drives 10 connected to the shared DC bus will share in dissipating regenerative energy from the DC bus 25 and their corresponding shunt devices 64 will be more evenly utilized.

Figure 8:
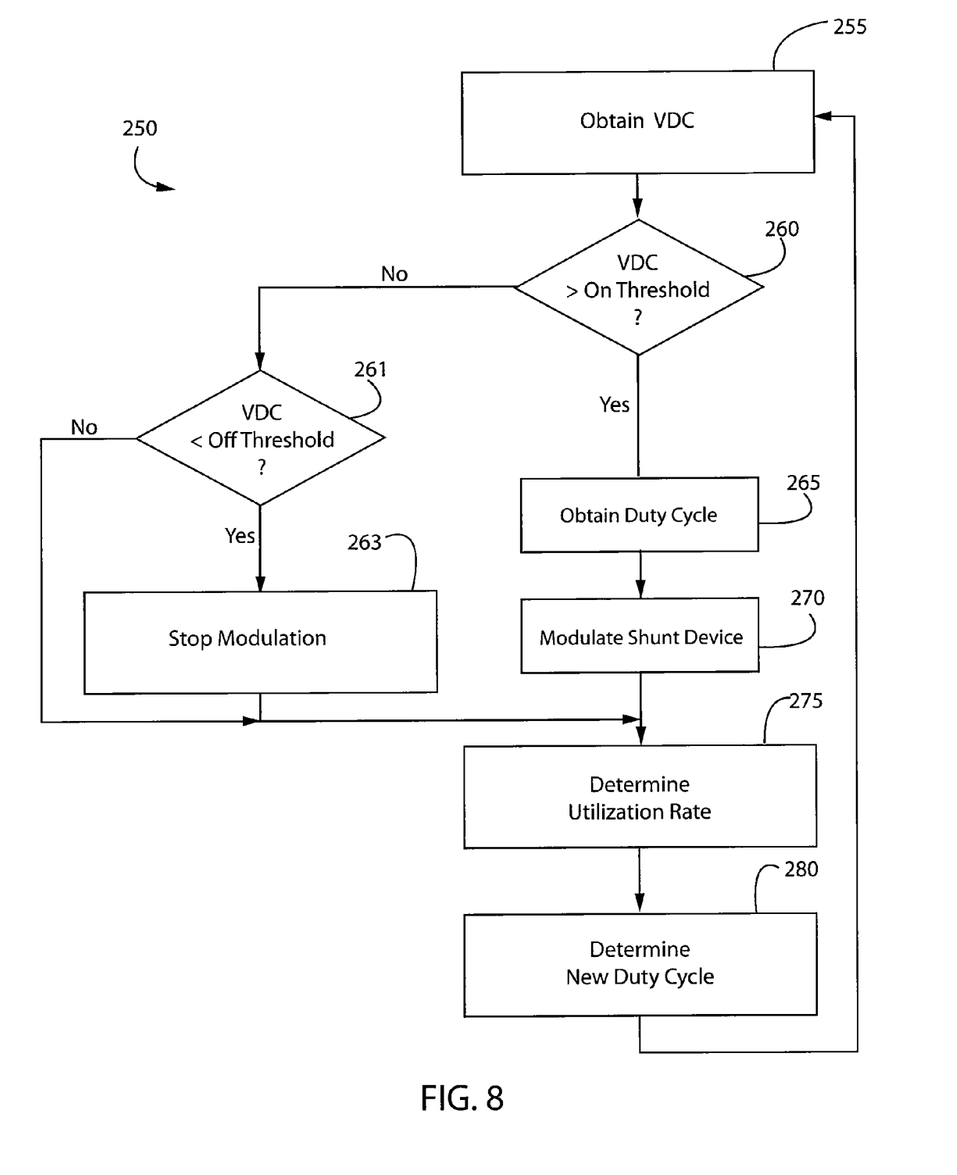
FIG. 8 is a flowchart illustrating variation of the duty cycle of modulation of the shunt device according to one embodiment of the present invention.

According to another embodiment of the invention, the shunt control module 60 may vary the duty cycle, D, of the modulated shunt switch signal 130 to vary the power dissipated by the shunt device 64. Referring to FIG. 8, a flowchart 250 illustrates the steps executed by the processor 50 to vary the duty cycle, D, of the modulated shunt switch signal 130.

At step 255, the processor 50 obtains the voltage level 105 present on the DC bus 25. The voltage level 105 is compared against the initial value of the turn on threshold 115 at step 210. If the voltage level 105 is greater than the turn on threshold 115, the shunt control module 60 obtains the present value of the duty cycle, D, as shown in step 265. The duty cycle, D, may be stored in and read from memory 45. The shunt control module 60 next modulates, periodically turning on and off, the shunt switch signal 130 according to the duty cycle, D, as shown in step 270. If the voltage level 105 is less than the turn on threshold 115, the voltage level 105 is compared against the initial value of the turn off threshold 112 at step 261. If the voltage level 105 is less than the turn off threshold 112, the shunt control module 60 stops modulation of the shunt device 64 at step 263. If the voltage level 105 is less than the turn on threshold 115 and greater than the turn off threshold 112, the shunt control module continues execution in the present state at step 275. At step 275, the utilization rate of the shunt device 64 is determined as discussed above with respect to FIG. 9. In step 280, the duty cycle, D, is adjusted as a function of the utilization rate. As the utilization rate increases, the duty cycle, D, is decreased such that the shunt device 64 is used less frequently. As the utilization rate decreases, the duty cycle, D, is increased such that the shunt device 64 is used more frequently. According to one embodiment of the invention, a look up table is stored in memory 45 that defines new values of the duty cycle, D, corresponding to varying utilization rates. Optionally, the duty cycle, D, may be varied, for example, as a linear function of the utilization rate.

Figure 6:
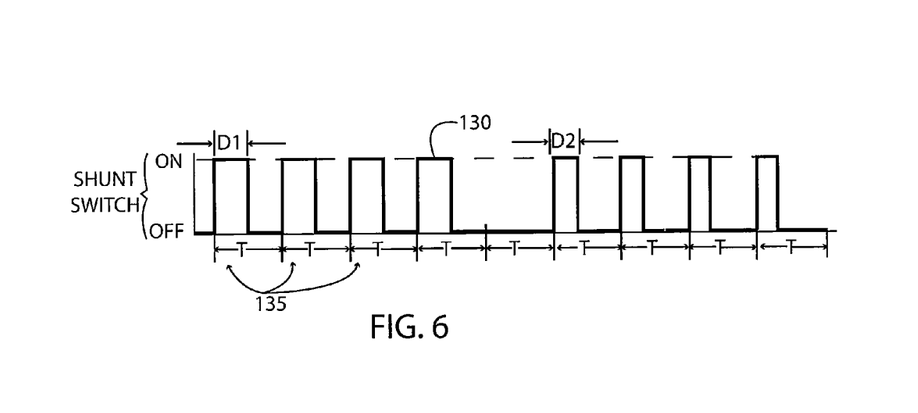
FIG. 6 is a graphical representation of varying the duty cycle of modulation of the shunt device according to one embodiment of the present invention.

Referring also to FIG. 6, exemplary operation of the shunt control module 60 during two consecutive regenerative operations during which the duty cycle, D, of the shunt switch signal 130 is varied is illustrated. During the initial regenerative operation, an initial value of the duty cycle, D1, is used to modulate the shunt switch signal 130. Regenerative operation continues for four cycles 135 of the modulation and is off for one cycle 135. During the first regenerative operation, the shunt control module 60 monitors utilization of the shunt device 64. As a result, the duration of the duty cycle, D, is decreased from the first duty cycle, D1, to a second duty cycle, D2. Regenerative operation is shown for four additional cycles 135 using the second duty cycle, D2. As a result of the decreasing value of the duty cycle, D, the shunt switch signal 130 is turned on for a shorter percentage of each subsequent regenerative operation. If the voltage level 105 on the DC bus 25 remains at the nominal value 110, or at least below the turn on threshold 115, for an extended duration, the shunt control module 60 will increase the duty cycle, D, until it returns to the initial value.

When multiple motor drives 10 are connected to a common DC bus, variation of the duty cycle, D, prevents the shunt device 64 of a single motor drive 10 from becoming overloaded if that motor drive 10 would otherwise be the primary motor drive 10 to connect its shunt device 64 to the DC bus 25. If one motor drive 10 is continually connecting its corresponding shunt device 64 to the DC bus 25, its duty cycle decreases such that it dissipates less energy from the DC bus 25, requiring another motor drive 10 to begin connecting its corresponding shunt device 64 to the DC bus 25. Further, as the second motor drive 10 is now dissipating more energy, from the DC bus 25, its duty cycle begins to decrease while the duty cycle on the first motor drive 10 begins to increase. Consequently, each of the motor drives 10 connected to the shared DC bus will share in dissipating regenerative energy from the DC bus 25 and their corresponding shunt devices 64 will be more evenly utilized.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of controlling shunt utilization in a power converter sharing a DC bus with at least one other power converter, wherein the DC bus includes a first rail and a second rail, the method comprising the steps of: monitoring a magnitude of a voltage present on the DC bus; connecting a shunt device between the first rail and the second rail to discharge a desired amount of power when the magnitude of the voltage present on the DC bus exceeds a threshold, wherein the shunt device is connected in a modulated manner such that the shunt device is connected between the first rail and the second rail for a first portion of a periodic interval and disconnected for a second portion of the periodic interval and wherein the ratio of the first portion to the second portion defines a duty cycle of the modulation; determining a utilization rate of the shunt device, wherein the utilization rate is a function of a duration of time when the magnitude of the voltage present on the DC bus exceeds the threshold, increasing when the shunt device is being modulated between the first and the second rail and decreasing when the shunt device is not being modulated between the first and the second rail; and decreasing the desired amount of power discharged by the shunt device as the utilization rate increases.

2. The method of controlling shunt utilization of claim 1 wherein the desired amount of power is defined by the voltage threshold such that the shunt device is connected while the magnitude of the voltage present on the DC bus exceeds the threshold and the desired amount of power discharged by the shunt device is decreased by increasing the threshold.

3. The method of claim 2 further comprising the step of increasing the desired amount of power discharged by the shunt device as the utilization rate decreases wherein the desired amount of power discharged by the shunt device is increased by decreasing the threshold.

4. The method of controlling shunt utilization of claim 1 wherein the desired amount of power discharged by the shunt device is decreased by decreasing the duty cycle.

5. The method of claim 4 further comprising the step of increasing the desired amount of power discharged by the shunt device as the utilization rate decreases wherein the desired amount of power discharged by the shunt device is increased by increasing the duty cycle.

6. The method of claim 1, further comprising the step of increasing the desired amount of power discharged by the shunt device as the utilization rate decreases.

7. A power converter for connection to a shared DC bus with variable shunt utilization, the power converter comprising: a DC bus having a first rail and a second rail; an output connection configured to connect the DC bus of the power converter to the shared DC bus; a pair of terminals configured to connect to an external shunt device; a switch configured to selectively connect at least one of the terminals to one of the first or second rails of the DC bus; a sensor configured to generate a signal corresponding to a magnitude of a voltage present on the DC bus; a non-transitory storage medium storing a program; and a processor configured to read the program from the non-transitory storage medium and configured to execute the series of instructions to: read the signal corresponding to the magnitude of the voltage present on the DC bus, determine when the signal corresponding to the magnitude of the voltage present on the DC bus exceeds a first voltage threshold; determine a duty cycle of a periodic interval for connecting the switch in a modulated manner, wherein the duty cycle is a percentage of the periodic interval and the periodic interval is repeated while the signal corresponding to the magnitude of the voltage present on the DC bus exceed the first voltage threshold; determine a utilization rate of the external shunt device, wherein the utilization rate increases when the shunt device is being modulated between the first and the second rail and decreases when the shunt device is not being modulated between the first and the second rail, and control the switch as a function of the duty cycle, the utilization rate and of the signal corresponding to a magnitude of a voltage present on the DC bus.

8. The power converter of claim 7 wherein the processor is further configured to control the switch to connect the at least one terminal to the first or second rail of the DC bus for a shorter duration as the utilization rate increases and for a greater duration as the utilization rate decreases.

9. The power converter of claim 8 wherein the processor is further configured to control the switch to connect the at least one terminal to the first or second rail of the DC bus if the magnitude of the voltage present on the DC bus exceeds a first threshold and to disconnect the at least one terminal from the first or second rail of the DC bus if the magnitude of the voltage present on the DC bus drops below a second threshold, where the second threshold is less than the first threshold, and wherein the processor is configured to increase both the first threshold and the second threshold as the utilization rate increases.

10. The power converter of claim 9 wherein the processor is configured to decrease both the first threshold and the second threshold as the utilization rate decreases.

11. The power converter of claim 8 wherein the processor is further configured to:
generate a pulse train as a function of the periodic interval and of the duty cycle, wherein the duty cycle is variable; and
decrease the duty cycle of the pulse train as the utilization rate increases.

12. The power converter of claim 11 wherein the processor is further configured to increase the duty cycle of the pulse train as the utilization rate decreases.

* * * * *